United States Patent [19]

Hadwiger

[11] 4,208,105

[45] Jun. 17, 1980

[54] REFLECTIVE DEVICE AND METHOD FOR VIEWING ONE'S OWN FACIAL AREAS

[75] Inventor: Kenneth E. Hadwiger, Charleston, Ill.

[73] Assignees: Jerry Grifith, Charleston; Goldsmith Yamasaki Specht, Chicago, both of Ill.; part interest to each

[21] Appl. No.: 967,120

[22] Filed: Dec. 7, 1978

[51] Int. Cl.$^2$ ............................................. G02B 5/08
[52] U.S. Cl. ................................... 350/306; 350/305; 350/320; 350/294
[58] Field of Search ............... 350/306, 305, 296, 294, 350/297, 301, 320, 299

[56] References Cited

U.S. PATENT DOCUMENTS

| | | | |
|---|---|---|---|
| 518,382 | 4/1894 | Wiederer | 350/306 |
| 3,620,605 | 11/1971 | Clark | 350/305 |
| 3,737,216 | 5/1973 | Noda | 350/306 |

*Primary Examiner*—Jon W. Henry
*Attorney, Agent, or Firm*—Edmond T. Patnaude

[57] ABSTRACT

A three mirror arrangement for an observer viewing himself from a direction offset from the line of sight and a method of so viewing with manipulation of a contact lens is disclosed. The mirrors may be held in a collapsible arrangement and the two mirrors generally facing the observer may be curved.

12 Claims, 6 Drawing Figures

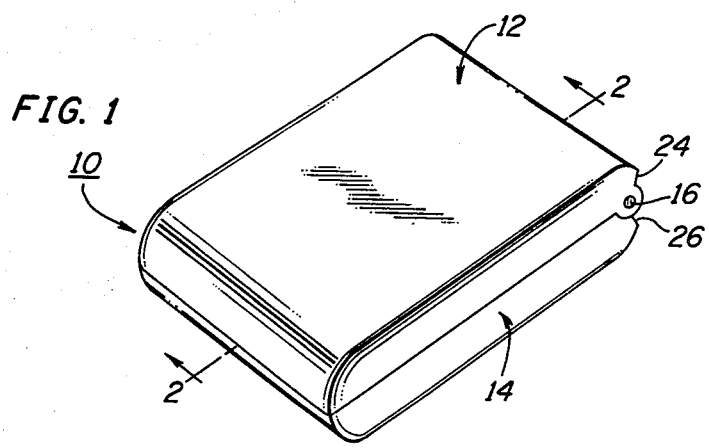
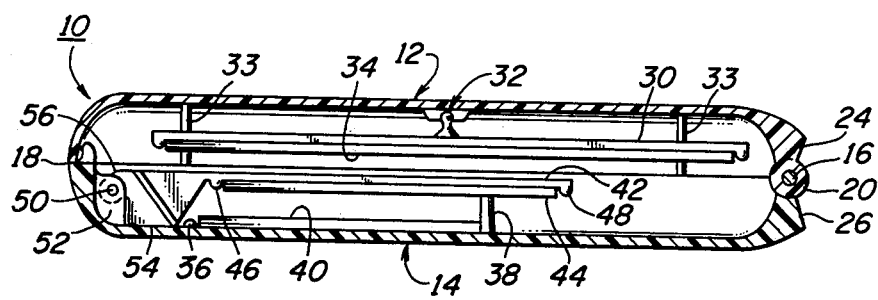
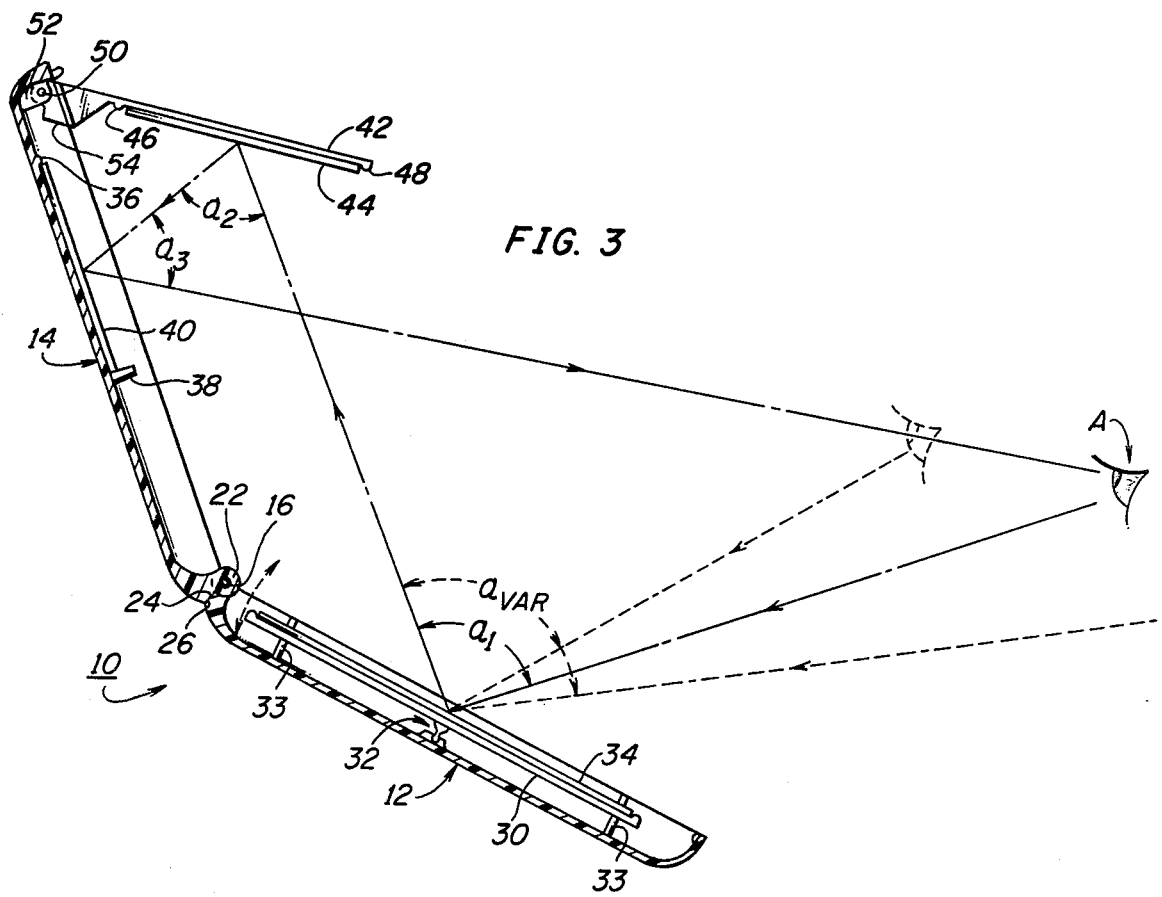

REFLECTIVE DEVICE AND METHOD FOR VIEWING ONE'S OWN FACIAL AREAS

The present invention relates in general to the art of self observation by means of a plurality of mirrors, and it relates in particular to a new and improved system of mirrors which enables the observation of one's own eyes and adjacent facial areas as well as to a method of using a system of mirrors to observe one's own eyes during for example, the manipulation of an opthalmic contact lens in one's own eye.

BACKGROUND OF THE INVENTION

Manipulation of contact lenses in the eyes during insertion of the lenses but more particularly during removal of the lenses requires considerable dexterity, and unless performed properly, can easily scratch and otherwise damage the external surface of the cornea or schlera. For example, the standard procedure recommended by eye care specialists for removing soft contact lenses from the eyes involves pulling down the lower eyelid with the middle finger, and looking up to elevate the pupil while simultaneously using one index finger to slide the lens downwardly off the cornea and onto the schlera portion of the eyeball. Then, while still looking up and holding the lower eyelid down the wearer must squeeze the opposite side edges of the lens between his thumb and index finger to cause the lens to buckle outwardly thereby to break the suction between the eye and the lens. The lens may then be removed with the index finger and thumb. This is a relatively difficult procedure when performed in front of a simple mirror inasmuch as the wearer's hand is necessarily within the line of sight of the eye and close to the eye, wherefor it causes the eyelids to blink in a reflex action. Moreover, since the normal effect of blinking is to cause the pupil to return to its central or straight ahead position, the chance of damage to the eyeball is accentuated. Although most people can train themselves in a matter of weeks to avoid blinking during this procedure, many persons can never do so, and moreover, reflex blinking with the concomitant danger of scratching the cornea and/or schlera is almost always a problem for persons who are learning to wear contact lenses.

I have also found that reflex blinking which is occasioned by positioning one's hand or the like in proxmity to the eye and close to the line of sight thereof makes it difficult for many persons to apply eye cosmetics, such as masccara to the eyelashes and eye liner to the eyelids. While the possibility of eye damage is not so great as when manipulating lenses in the eyes, such uncontrolled blinking does present a serious inconvenience for many people.

SUMMARY OF THE INVENTION

Briefly, there is provided in accordance with one aspect of the present invention a new and improved method of self observation of the eyes which facilitates the manipulation of contact lenses on the eyeball and which facilitates the application of cosmetics to the eyelids and closely adjacent facial areas. This method involves the use of three mirrors which are oriented relative to the eye in such a way that the eye is observed from a direction which is angularly displaced from the line of sight of the eye. When using this method to look at one's own eye, a contact lens can be easily manipulated with the fingers inasmuch as the fingers do not obstruct the line of sight of the eye, and reflex blinking does not occur. In like manner mascara and other eye makeup can easily be applied because the problem of uncontrolled blinking is alleviated.

In accordance with another aspect of the invention there is provided a new and improved device including a plurality of mirrors arranged in a manner for use in carrying out the heretofore discussed method of self observation of the eyes and adjacent facial areas. This device is relatively small and compact, and thus portable, may be collapsible for convenient storage when not in use, may be positioned in proximity to the eyes of the user to minimize the effects of inherent visual impairments of the user such as myopia, and has a relatively large viewing area to permit the user to adjust the effective distance between the eyes and the area being viewed to accommodate for other inherent visual impairments such as hyperopia and to provide adequate room, for example, for positioning the fingers for manipulaton of a lens.

GENERAL DESCRIPTION OF THE DRAWINGS

The present invention will be better understood by a reading of the following detailed description taken in connection with the accompanying drawings wherein:

FIG. 1 is a perspective view of a device embodying the present invention, which device is illustrated in the closed, storage position;

FIG. 2 is a cross sectional view taken along the line 2—2 of FIG. 1;

FIG. 3 is an elevational view showing the device of FIG. 1 in use;

DETAILED DESCRIPTION OF THE INVENTION

Figure 4:
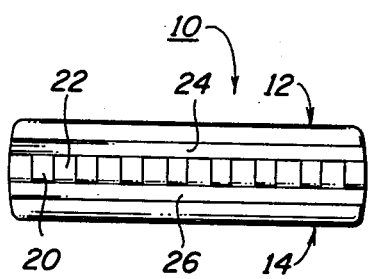
FIG. 4 is an end view taken from the right hand side of FIG. 2.

Referring particularly to FIGS. 1, 2 and 3, an instrument for viewing the facial areas in the vicinity of one's own eyes is generally identified by the reference character 10 and includes a pair of body members 12 and 14 which are hingedly connected together on a shaft 16. A detent type closure 18 is provided between the body members 12 and 14 at the end opposite the shaft 16. In FIGS. 1 and 2 the instrument 10 is shown in the closed storage condition with the body members 12 and 14 snapped together. The body members 12 and 14 respectively include interfitting apertured lug portions 20 and 22 through which the shaft 16 extends and a pair of abutment surfaces 24 and 26 which precisely position the body members 12 and 14 in predetermined angular relationship when the body members are fully opened with the abutting surfaces 24 and 26 in juxtaposed relationship.

A mirror support plate 30 is mounted at an angularly adjustable position within the body member 12 by any suitable means such for example, as a ball and socket connector 32 and side brace members 33 which frictionally abut the side edges of the plate 30. A mirror 34 is mounted to the lower face of the mirror support plate 30 as viewed in FIG. 2 whereby its position is adjustably fixed within the body member 12.

Fixedly mounted within the cover member 14 between a pair of upstanding ribs 36 and 38 is a mirror 40. A second mirror support platform 42 carrying a mirror 44 between a pair of ribs 46 and 48 is hingedly mounted to the body member 14 on a shaft 50. More particularly, a plurality of integral lugs 52 are provided on the interior of the body member 14 adjacent to the left hand end as viewed in FIG. 2 and are provided with aligned apertures through which the shaft 50 extends. The mirror support 42 is provided with an elongated hole through which the shaft 50 extends. The rib 38 on the body member 14 and a lug portion 54 on the mirror support 42 hold the mirror 44 in displaced relationship from the mirror 40 when the unit is in the collapsed condition. An interference fit is provided between the lugs 52 and the adjacent portion of the mirror support 42 so that the resiliency of the lugs 52 hold the mirror support in the set position as shown, for example, in FIG. 3. The mirror support 42 is provided with an abutment shoulder 56 which in the fully open usable position of the instrument engages the inner end wall of the cover 14 to set the mirror 42 in the precise predetermined position relative to the mirrors 40 and 34 for the reasons described in greater detail hereinafter.

In order to use the instrument 10 to observe one's own eyes and adjacent facial areas the body member 12 is opened so as to position the shoulder 24 against the shoulder 26, and the body member 14 is positioned in the relatively upright position as illustrated in FIG. 3. With the mirror support 42 in the fully opened position, as also shown in FIG. 3, the entire device 10 is positioned relative to the eyes A of the user such that rays of light emanating from the lower portion of the schlera are reflected from the mirror 34 to the mirror 42 and are from there reflected to the mirror 40 to the pupil of the eye. By positioning the instrument 10 somewhat above the straight ahead line of vision of the eye A the pupil is positioned at the top of the eye as required in the normal placement and removal of contact lenses therein and the eye is observed from an apparent position well below the eye. Preferably, the line of sight is displaced from the line of observation by an angle of between about 30° and 35°. Consequently, when the fingers are placed in proximity to the eye for manipulating a contact lense or eye makeup applicator they are not in the direct line of vision of the eye and do not, therefore, cause the reflex blinking heretofore described. Although the fingers may and will normally be in the overall field of vision of the eye A i.e., in the path from the schlera to mirror 34, the other eye nevertheless sees the fingers and the lens or cosmetic applicator throughout the process.

An important feature of the present invention is that the rays of light which are directed to the pupil of the eye A from the mirror 40 have been reflected at acute angles from each of the mirrors 34, 44 and 40. Consequently, the vertical field of vision is not appreciably foreshortened as would be the case if the reflective angles were obtuse angles. Also, the mirror 34 which initially collects the light from the eye A and adjacent facial areas is the largest, the mirror 44 being the second largest and the mirror 40 being the smallest. It will be understood that these mirrors all have the same width which may be approximately two and one-half inches which is sufficient to provide an adequate horizontal field of vision for observing one eye and its adjacent facial areas with the other eye.

Figure 5:
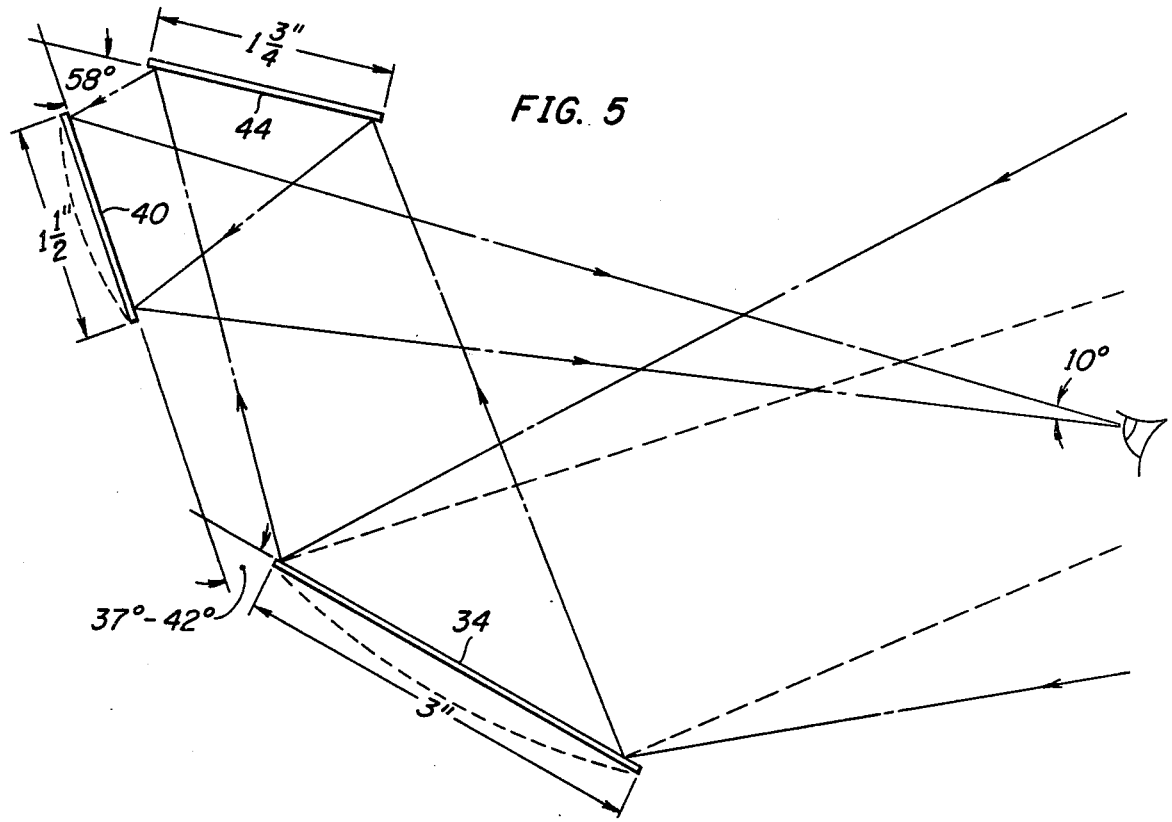
FIG. 5 is a schematic diagram which is useful in understanding the operaton of instruments embodying this invention.

With reference to FIG. 5, I have found that assuming an average vertical field of view of ten degrees for the normal eye, a mirror 40 having a vertical dimension of about one and one-half inches, a mirror 44 having a front to rear dimension of about one and three quarter inches, and a mirror 34 having a front to rear dimension of about three inches provides a good proportional sizing of the mirrors to enable the normal user to position the instrument sufficiently far from the eye as to provide adequate space in which to place the hands for manipulation of lenses or eye makeup applicators. In this regard the mirrors 40 and 42 should be positioned at a relative included angle of about 58° and the included angle between the planes of the mirrors 40 and 34 should be between 37° and 42°. It will be understood that these angles may be changed to some extent but the tests I have made to date indicate these are the optimum angles where a sufficiently large field of view of the eye and adjacent facial area is to be provided for the normal person.

In order to enable the observation of a relatively large facial area with a relatively small instrument, either or both of the mirrors 34 and 40 can be concave magnifying mirrors. It must be understood, however, that the use of such magnifying mirrors will introduce some distortion, but for some applications this distortion may be acceptable This is the case, for example, where the instrument is to be used by persons having hyperopia.

Figure 6:
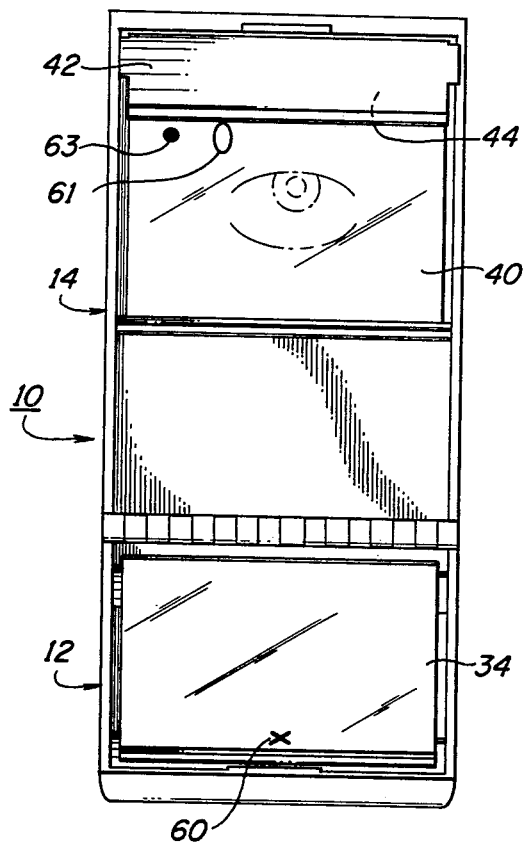
FIG. 6 is a front view of another embodiment of the invention.

Referring to FIG. 6, there is shown an embodiment of the invention which incorporates means for facilitating the proper positioning of the instrument relative to the eye to be observed. As shown, a reference mark 60 in the form of an X is provided near the bottom of the center of the mirror 34 and a loop 61 descends from the left hand side of the foreward edge of the mirror 44. A second reference mark 63 in the form of a dot is provided in the left hand upper corner of the mirror 40.

In use, the mark 60 is placed about four inches from the nose of the user and using the left eye only, the mark 63 is lined up with the opening in the loop 61. With the instrument 10 thus located, the eye and adjacent facial areas will be observed in the manner described above.

Again referring to FIG. 3, the purpose for providing limited angular adjustment of the mirror 34 is shown. As may there be seen, the angular position of the mirror 34 relative to the mirrors 40 and 44 may be changed to enable the distance between the eye and the mirror 34 to be changed to accommodate for acute myopia and hyperopia. The solid line position of the eye in FIG. 3 provides a focused image for a normal eye. The dotted line position of the eye provides a focused image for acutely nearsighted eyes. It will be seen from FIG. 3 that the line of sight and the direction of observation remain substantially the same as the angle of the mirror 34 is adjusted and the position of the eye is changed accordingly.

The ball and socket connector 32 also enables the mirror 34 and its associated support plate 30 to be readily snapped out of the body member 14 and replaced with a magnifying mirror where desired.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A reflective system for use in viewing one's own facial areas in the vicinity of the eyes, comprising
   first mirror means for collecting and reflecting rays of light emanating from said facial areas,
   second mirror means for collecting and reflecting said rays of light reflected from said first mirror means,
   third mirror means for collecting and reflecting said rays of light reflected from said second mirror means, and
   said first, second and third mirror means being mutually positioned with said third mirror means substantially facing said facial areas, with said first mirror means below said third mirror means, and with said second mirror means above said first mirror means.

2. A reflective system according to claim 1 wherein said first mirror means is larger than said second mirror means which is in turn larger than said third mirror means.

3. A reflective system according to claim 1 wherein at least one of said mirror means is a magnifier.

4. A reflective system according claim 1 comprising a case,
   said first and second mirror means being hingedly connected to said case for swinging movement into a collapsed position over said third mirror means with one of said first and second mirror means at least partially disposed between said third mirror means and the other of said first and second mirror means.

5. A reflective system according to claim 4 comprising
   means incorporated in said case for holding said mirrors in fixed relative positions during use thereof.

6. A reflective system according to claim 4 comprising
   means for adjusting the angular position of one of said mirrors in said case.

7. A reflective system according to claim 1, comprising
   a case,
   first hinge means connecting said first mirror means to said third mirror means for swinging movement of said first mirror means between a fixed operative position and a collapsed position over said third mirror means, and
   second hinge means connecting said second mirror means to said third mirror means for swinging movement between a fixed operative position and a collapsed position over said third mirror means.

8. A reflective system according to claim 7 wherein said first and second hinge means comprise
   abutment means for setting said first and second mirror means in said fixed operative positions.

9. A reflective system according to claim 7, comprising
   means snap-fitting at least one of said mirror means to said case.

10. A method of observing one's own eye while manipulating an opthalmic contact lens thereon, comprising the steps of
    positioning a first mirror to one side and in front of said eye at an angle such that light rays reflected from said eye are reflected from said mirror at an angle of less than ninety degrees from the angle of incidence,
    positioning a second mirror above and in front of said eye at a position to intercept and reflect said rays reflected from said first mirror away from said eye at an angle of less than ninety degrees from the angle of incidence,
    positioning a third mirror between said first and second mirrors in a direction facing toward said eye and intercepting said rays reflected from said second mirror, and
    observing the image of said eye and said lens reflected to said third mirror by said first and second mirrors while manipulating said lens in said eye,
    whereby said eye is observed from a direction different from the line of sight of said eye, thereby facilitating the holding of the pupils in an elevated position during the manipulation of said lens.

11. A method according to claim 10 wherein p1 said rays of light are reflected from said mirrors at acute angles relative to the angles of incidence.

12. A method according to claim 11 wherein said line of sight is displaced from the line of observation by an angle between about 30° and 35°.

* * * * *